Dec. 14, 1965 H. P. KALMUS 3,222,980
DEVICE FOR ACCURATELY MEASURING SMALL AMOUNTS
OF RADIANT ENERGY
Original Filed March 31, 1960 3 Sheets-Sheet 1

INVENTOR
Henry P. Kalmus

BY  Max L. Libman
ATTORNEY

Dec. 14, 1965   H. P. KALMUS   3,222,980
DEVICE FOR ACCURATELY MEASURING SMALL AMOUNTS
OF RADIANT ENERGY
Original Filed March 31, 1960   3 Sheets-Sheet 2
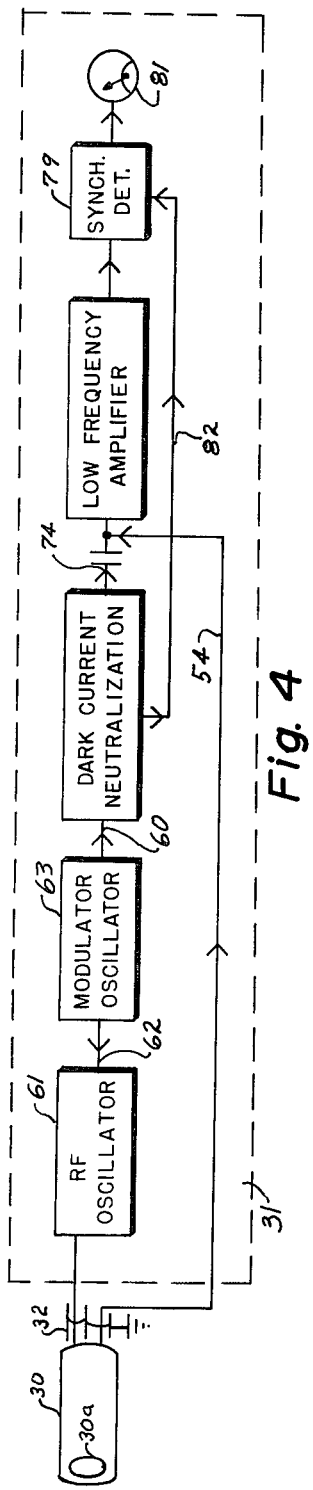
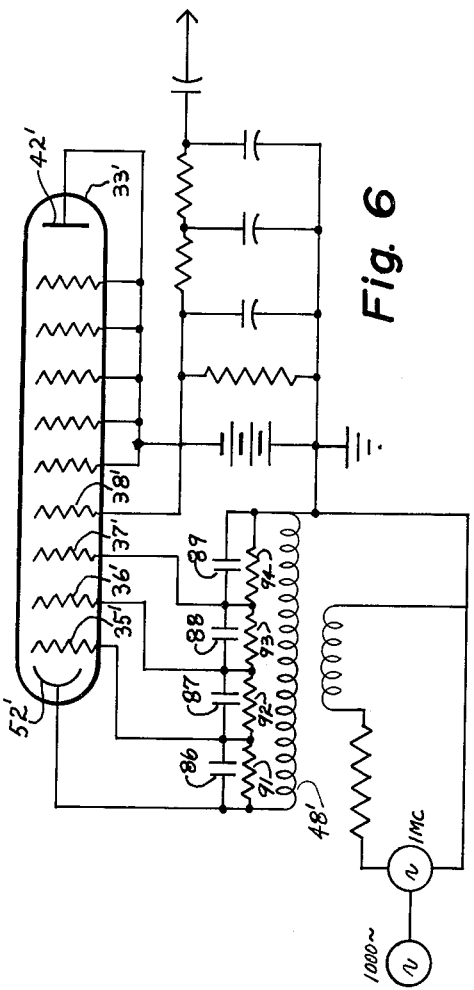
INVENTOR
*Henry P. Kalmus*
BY *Max L. Libman*
ATTORNEY

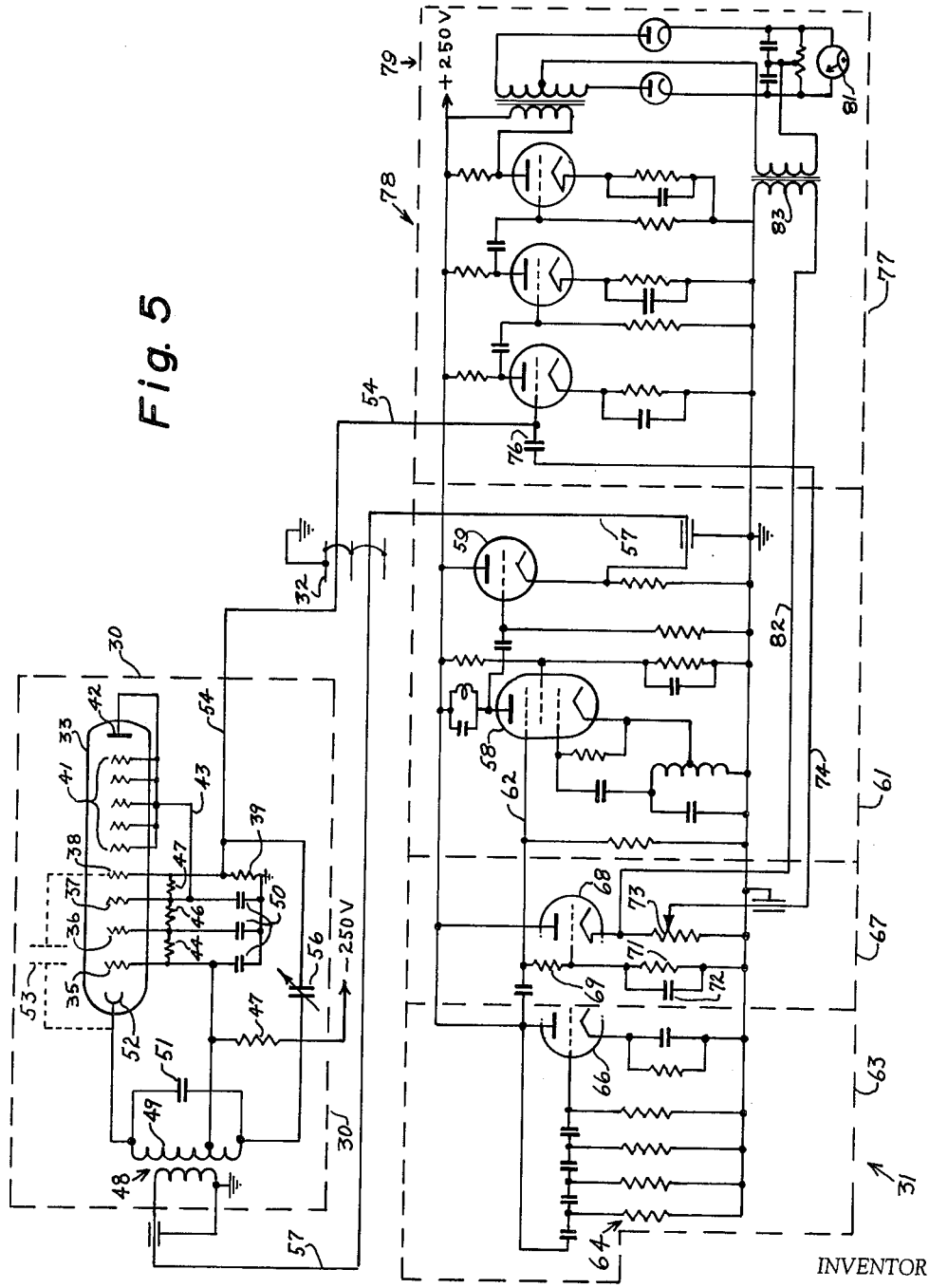

United States Patent Office 3,222,980
Patented Dec. 14, 1965

3,222,980
DEVICE FOR ACCURATELY MEASURING SMALL
AMOUNTS OF RADIANT ENERGY
Henry P. Kalmus, 3000 University Terrace NW.,
Washington, D.C.
Continuation of application Ser. No. 18,893, Mar. 31,
1960. This application Dec. 21, 1964, Ser. No. 420,053
2 Claims. (Cl. 88—23)

This application is a continuation of application Serial No. 18,893, of Henry P. Kalmus, filed March 31, 1960, and now abandoned, for Device for Accurately Measuring Small Amounts of Radiant Energy.

This invention relates to an improved device for accurately measuring small amounts of radiant energy, and particularly radiant energy in the visible light spectrum.

Light measuring instrument employing vacuum phototubes are well known. In such devices, it is desirable to have the output appear as an A.-C. wave, since the use of a D.-C. output involves difficult stability problems. One manner of achieving this is by the use of magnetic modulation of the electron stream of the phototube which is used as the light-detecting element, as shown in U.S. Patent No. 2,424,933. This eliminates that part of the dark current which is caused by leakeage, since only free electrons in the interelectrode space are subjected to the magnetic modulation. However, it is desirable to use a small light-sensing unit, preferably almost as small as the phototube itself, for the sensing head, and the requirement for a bulky magnetic armature on the tube causes the head to be rather large. This would be particularly so where a photomultiplier is to be used, as in the present case. Another difficulty is that the fluctuating magnetic field produces mechanical vibrations of the internal phototube structure which limit the minimum detectable signal. The choice of a supersonic modulation frequency would relieve this condition, but the required modulating power and shielding difficulties make such a solution impractical.

Another solution is described in applicant's copending application Serial No. 747,937, for Electric Circuits, filed July 11, 1958, and now abandoned; this involves the use of double modulation, and has certain practical advantages which will become apparent from the following description. However, increasing sensitivity requirements make it desirable to produce light measuring instruments which are even more sensitive than any previously known.

It is the major object of the invention to provide a radiation-measuring device which is much more sensitive (e.g., capable of measuring very small light intensities) than any instrument previously available.

Another object is to provide a practical light-measuring instrument for commercial and laboratory use, of great sensitivity and reliability, using a photomultiplier as the light-sensitive element, and taking advantage of its superior sensitivity in a novel manner.

Another object is to utilize a photomultiplier in a light meter having a small, lightweight sensing head which is attached to the body of the apparatus only by a relatively thin flexible cable, and which does not require excessive shielding.

The above and other objects are achieved according to the invention by utilizing double modulation in a manner generally similar to that described in applicant's previously-mentioned copending application Serial No. 747,937, but taking advantage of the greater sensitivity of the photomultiplier in a novel manner. According to the invention, only a few dynode stages of a conventional nine-dynode photomultiplier are used, and special advantage is taken of the inherent shielding provided by the dynode structures themselves to minimize stray capacitance effects. A novel dark current neutralization circuit is also provided, all of the above features cooperating to produce a highly sensitive instrument as will be described below.

The specific nature of my invention, as well as other objects and advantages thereof, will clearly appear from a description of a preferred embodiment, as shown in the accompanying drawings, in which:

FIG. 4 is a block diagram of the invention;

FIG. 5 is a schematic circuit diagram of the invention, showing in detail the elements represented in the block diagram of FIG. 4; and FIG. 6 is a schematic circuit diagram of a modified form of the invention.

One limitation on the ultimate sensitivity which it is possible to attain with a phototube is the unavoidable thermal noise produced in the resistor terminating the phototube, even when using A.-C. methods. The bandwidth of the A.-C. amplifier must be small in order to separate the desired signal from the undesired fluctuations so that a long time is required for a reading if a very small light flux is to be measured.

A photomultiplier also requires a terminating resistor which produces thermal noise, but considerable "noise-free" gain is achieved before the signal reaches this resistor, so that relatively little amplification is required afterwards. Hence, the signal-to-noise ratio is much better and meter readings can be obtained in a much shorter time.

If a photomultiplier is used as a sensing element in the conventional manner without modulation, the supply voltage must be regulated very closely for good zero stability and calibration. The reason for this becomes clear if we consider that any instability of the supply voltage is literally multiplied at each dynode of the tube. For example, a change of say 1% of the gain per stage results in a total change of 9% of the total gain for a conventional nine-stage photomultiplier tube. In addition, other undesired effects such as light feedback and high dark current occur if all of the stages of a multiplier are used in order to obtain maximum gain. These drawbacks, coupled with the high expense of an adequately regulated voltage supply suitable for a photomultiplier have mitigated against the economical use of photomultipliers in practical photometric applications.

The present invention overcomes the above difficulties by the application of a new modulating method, applied in a novel manner to a photomultiplier so as to take advantage of its favorable characteristics while minimizing the effect of its unfavorable characteristics.

Figure 1:
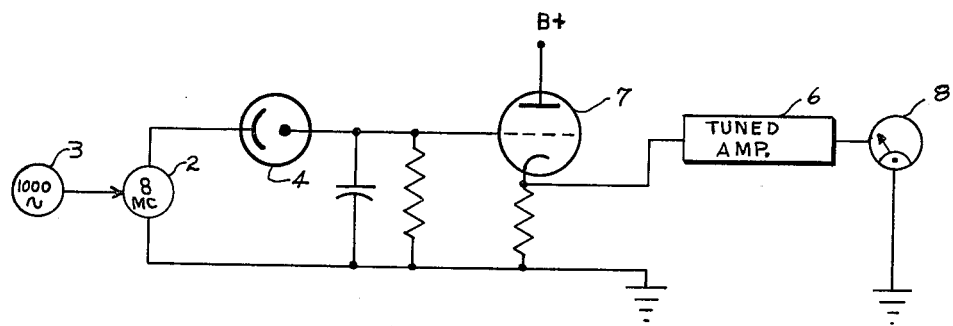
FIGS. 1 and 2 are simplified schematic circuit diagrams showing the principle of double modulation as applied to a phototube, in order to explain the basic principle of the invention.

FIG. 1 shows the basic principle of the new method applied not to a photomultiplier, but to a phototube as described in applicant's above-mentioned copending application Serial No. 747,937. Generator 2 produces a signal at a carrier-frequency of, say, 8 megacycles, which is amplitude modulated by generator 3 at a rate of, say, 1000 cycles per second. The phototube 4 is used as a rectifier whose internal impedence depends on the amount of light. The recovered envelope potential is fed to a tuned amplifier 6 through a cathode follower 7, and is measured by meter 8. With no light, the phototube with all its unavoidable leakage effects acts as a linear element so that no signal is developed at 1000 cycles. Hence, the system has good zero stability and produces no leakage or dark current readings. The modulation frequency can easily be made high enough so that shock and vibration cause no spurious signals.

The simple arrangement shown in FIG. 1 has two drawbacks. A spurious 1000 cycle signal may be present in the generator output, and some trace of the 8 megacycle signal may find its way into the cathode follower where it is demodulated because of the nonlinear tube characteristic. Both effects cause erroneous zero indications.

Figure 2:
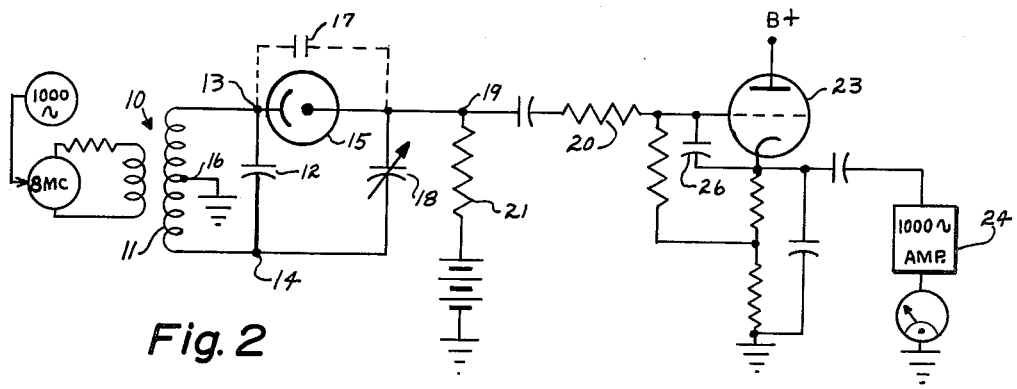

FIG. 2 shows the principle of an arrangement which avoids these drawbacks. The modulated signal, generated as before, is fed into a tuned circuit composed of inductance 11 and condenser 12, which removes the energy at the modulation frequency, leaving only the 8 megacycle carrier and both sidebands at the circuit terminals 13, 14. The circuit center is grounded at 16, and the capacity of the phototube, represented in phantom at 17, is balanced out by the neutralizing condenser 18. The output of the photocell at terminal 19 is developed across the load resistor 21 as the modulating envelope potential. The capacitance of condenser 18 is adjusted to equal the capacitance of the phototube, represented by 15, so that no R.-F. potential exists at point 19, and only a simple low pass filter 20, 26 is required between point 19 and the grid of cathode follower 23 to shunt any R.-F. energy which may appear at 19 because of incomplete neutralization. The envelope potential passes freely to the tube 23, whose output is connected to a 1000 cycle amplifier 24 as in FIG. 1. The bandwidth of amplifier 24 is preferably kept small by means of tuned elements and conventional synchronous detection.

At low light values, the phototube has a very high internal resistance and corresponds very closely to a constant current generator. The signal voltage for the cathode follower is developed as a voltage drop in the phototube load resistance 21 which, for the best signal-to-noise ratio, should be as high as possible. This is so because the signal is proportional to the value of this resistance, $R_L$, whereas the noise is proportional to the square root of $R_L$. Hence the signal-to-noise ratio is proportional to the square root of $R_L$. The noise developed in the cathode follower can be neglected.

In a practical instrument, the load for the phototube is complex, i.e., it is a resistor shunted by a condenser. Now, if the load is represented by $Z_L = a + jb$, the signal is proportional to $\sqrt{a^2 + b^2}$ and the noise, according to Nyquist's theory is proportional to $\sqrt{a}$. It can easily be shown that the signal-to-noise ratio is still proportional to $\sqrt{R_L}$ and that the shunting condenser has no detrimental effect. This condenser should, however, be kept as small as possible in order to obtain as high a signal voltage as possible, so that fluctuation noise and microphonics in the amplifier become unimportant. In a cathode follower, the potential difference between cathode and ground is almost equal to the voltage between grid and ground, so that the capacitance 26 which is connected between grid and cathode appears to the 1000 cycle signal as if it were much smaller. For the same reason all electrostatic shields should also be connected to the cathode.

It is interesting to compare the signal-to-noise ratio of the double modulation method with that of other systems. It is assumed that square wave modulation is applied and that the phototube acts as an ideal rectifier. It is further assumed that, after synchronous detection, the meter indication is proportional to the average current through $R_L$.

FIG. 3a shows the signal current in a conventional D.-C. system, with the dark current neglected. In FIG. 3b, the case of a light chopper or a magnetic switching device is illustrated. The signal-to-noise ratio is reduced by 6 db. FIG. 3c shows the case of double modulation; it can be seen that a further reduction by 6 db has to be accepted. In a practical instrument, however, the two A.-C. methods are very similar because of the greater flicker-effect and microphonic disturbances which are unavoidable in a low frequency amplifier; a low frequency must be employed with magnetic modulation.

The internal phototube resistance is directly proportional to light intensity so that good linearity of the instrument can be maintained. In this respect, the new method has the same operating characteristic as the conventional D.-C. method.

FIG. 4 shows in block diagram form, and FIG. 5 in schematic circuit diagram form, the manner in which the double modulation principle described above is applied to a photomultiplier tube. The elements enclosed in block 30 are all enclosed in a movable light sensing unit which can be readily placed by hand at the desired location for making a measurement, or can be clamped by known means in a desired relation to other instrumentalities. Only low impedance connections are used between the light sensing unit 30 and the rest of the apparatus, which is housed in a larger separate casing containing all the elements shown within line enclosure 31 (FIGS. 4 and 5), so conventional shielded flexible leads in the form of a thin flexible cable 32 can be used to connect 30 and 31. The sensing unit 30 is provided with a window 30a, through which light (or other radiant energy) being measured can impinge on the active sensing element 52 of the photomultiplier tube 33.

Referring to FIG. 5, the photomultiplier tube 33 is of a conventional type (e.g., 931–A) having nine dynodes, of which only three, namely dynodes 35, 36 and 37 are used as multiplier elements, a fourth dynode 38, serving as collector, terminated by resistor 39. The remaining dynodes 41 and the collector 42 are tied to the last active dynode, 37, by lead 43, which applies to them a negative potential with respect to the collector dynode 38, thus keeping them inactive.

A conventional voltage dividing arrangement of resistors 44, 46, 47 is used to supply the proper operating potentials to the active dynodes.

Figure 3:
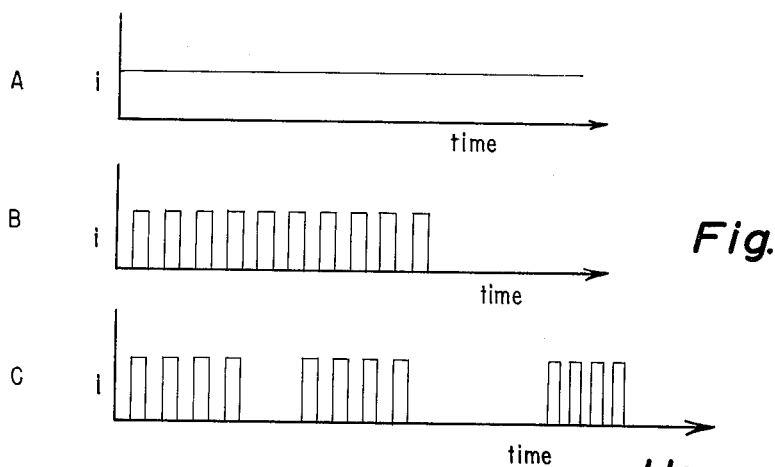
FIG. 3 shows explanatory graphs which demonstrate the theoretical principle of the invention.

Transformer 48, corresponding to transformer 10 of FIG. 2, has its secondary winding 49 tuned to the carrier frequency by means of condenser 51, and supplies a square wave modulated signal of, e.g., 110 volts amplitude, between the multiplier cathode 52 and first dynode 35. Hence current will flow only during positive excursions of this wave, and the action with respect to the cathode 52 is the same as described in connection with the preceding figures. As shown in FIG. 3, the signal at modulation frequency is reduced by 12 db as compared with the signal for conventional D.-C. operation. However, the three dynodes 35, 36, 37 give a gain of 40 db, and the signal-to-noise ratio at load resistor 39 is correspondingly increased by 40 db over simple vacuum tube operation such as shown in FIG. 1, neglecting the dark current noise.

The signal-to-noise ratio manifests itself in the production of random meter fluctuations. In a practical commercial instrument, these fluctuations should not extend over more than 2 percent of the scale for full-scale deflection. At very low light values (for which the present instrument is particularly suited) this performance cannot be obtained with a phototube as the light-sensing element, because the noise generated in the terminating resistor becomes prohibitively large. A photomultiplier provides noise-free gain; however, a conventional photomultiplier is also not well suited for this type of use because of the instability multiplication previously mentioned; conventional photomultiplier tubes provide extremely high gain which is necessary where the tube is not followed by an A.-C. amplifier; in this case the instability must be accepted. In the present invention, however, A.-C. amplification is employed, and the gain in the photomultiplier itself is limited in such a manner as to avoid excessive instability. It has been suggested in the U.S. patent to Moe, 2,828,424, to operate a photomultiplier at a small fraction of its usual current, in order to overcome some of its inherent disadvantages, but this, although it reduces the amplification, does not reduce the multiplier instability effect due to the large number of dynodes. The present invention solves the problem by providing only enough gain (due to multiplication) to serve the desired purpose, but limits the number of dynodes to a point at which an intolerable amount of multiplier instability does not occur. Since each dynode stage produces multiplication (when used in the usual manner) by a factor of more than four, three stages will give a multiplication gain of approximately 100, but the instability will be increased by only a relatively small amount.

In a commercial instrument of the type shown in Patent No. 2,424,933 (magnetic modulation), full scale deflection is obtainable for a light flux of 0.1 microlumen. The noise-free gain of the photomultiplier increases the signal-to-noise ratio by 34 db (6 db are lost because of double modulation, as previously explained), so that, even neglecting the advantages of the potentially higher modulating frequency which can be used with this arrangement, a full scale deflection can now be obtained for a flux of about 0.002 microlumen if the same time of response is maintained. This sensitivity is ample for the most stringent requirements in the fields of photography and colorimetry. Hence the use of only three dynodes (or at most, four) is justified, and makes it possible to produce multiplier instruments with good stability and accuracy, even at this high sensitivity.

It should be noted that by using only three dynodes, a 1% change in dynode gain will produce only a 3% variation of the over-all amplification, so that inexpensive voltage regulating means can now be employed for satisfactory operation.

Referring again to FIG. 5, the multiplier-terminating load resistor 39 is connected between dynode 38 and ground. A bias voltage of −250 volts is applied through resistor 47, producing 100 volts between dynodes 35–36 and 36–37 respectively, and 50 volts between dynodes 37–38. This last pair has the flat characteristic of a vacuum phototube, reaching saturation after about 40 volts, so that nothing is gained by a further increase in D.C. potential.

Any stray capacitance (represented in phantom by condenser 53) carrying R.-F. potential to output lead 54, is neutralized by capacitor 56, corresponding to capacitor 18 in FIG. 2.

The modulated high frequency is supplied to transformer 48 on lead 57 by the output of high-frequency oscillator tube 58 through amplifier 59 of R.-F. section 61 (FIGS. 4 and 5). The output of the R.-F. section is alternately turned on and off by the low-frequency modulating output, on line 62, from low-frequency oscillator section 63; this is shown as a phase-shift oscillator circuit 64 for tube 66, although it will be apparent that any other suitable oscillator circuitry could be used.

Section 67 provides a special means according to an important feature of the invention, for dark current compensation. This is necessary because the dark current in a photomultiplier at room temperature with all stages working is equivalent to a current which would be produced by a light flux of 0.001 microlumen. This current consists of a resistive and a thermionic part; only the latter will produce demodulation of the high-frequency signal. Utilizing only three dynodes as shown greatly reduces the magnitude of this deleterious effect; however, considering the fact that full scale deflection is required for a light flux of 0.002 microlumen, the dark current effect should be compensated for so that substantially zero stability can be obtained. This is accomplished by the circuit shown as follows: The low frequency potential derived from tube 66 is also applied to the grid of cathode follower 68 through a phase shifting network 69, 71, 72. Potentiometer 73 is provided in the cathode lead of tube 68, which makes it possible to adjust the output voltage of the cathode follower to any desired value. This output is connected through lead 74 and coupling capacitor 76 to the input of low-frequency amplifier 78. The impedance of capacitor 76 is made large compared to that of resistor 39, which may be, in a typical case, 22 megohms. Since the phase shifting network 69, 71, 72, is designed to produce a voltage at dynode 38 which is 180° out of phase with the voltage developed in the multiplier due to the dark current, good compensation is accomplished.

Lead 54 is connected to the input terminal of low frequency amplifier section 77 which is shown as containing three stages of amplification 78 (but may be of any suitable form), followed by a synchronous detector 79 and an indicator meter 81, usually calibrated in terms of light flux. The synchronous detector is gated (at the low-frequency rate) from the output of cathode follower on line 82 through transformer 83.

It should be particularly noted that capacitors 50 are interposed between the respective dynodes, 35, 36, 37 and ground, which serves to dynamically ground the dynodes at the high frequency. This provides a great advantage in minimizing the undesirable effect of stray capacitance, 53, compared to a phototube. This is due to the effect of the dynamically grounded dynodes in the multiplier, which act as shields between the cathode 53 and the fourth (or collector) dynode 38, so that only a very small transfer capacitance results. This capacitance is easily compensated by capacitor 56, and this simple neutralization of the stray capacitance is sufficient to prevent the R.-F. signals from entering the low-frequency amplifier 77, due to the above-shielding action of the dynodes in the circuit arrangement shown.

In the arrangement shown, the R.-F. is applied only between the cathode 52 and the first dynode 35, and a steady D.-C. bias is applied at all times to the remaining active dynodes. In some instances, it would be advantageous to apply the R.-F. to all of the active dynodes or certain combinations thereof, so that they are not biased except when the signal is applied.

FIG. 6 shows such an arrangement. In this modification, elements corresponding to those previously described are given the same reference numerals, with a prime added, for identification. The chief difference is that now the R.-F. voltage for transformer 48' is applied through condensers 86, 87, 88 and 89, suitably of 300 mf. each to produce the necessary voltage differences between the respective electrodes at the high frequency. Between the pulses of high frequency energy (due to the low modulation frequency) there is no bias on the active electrodes, thus reducing undesired noise output signals. It will be apparent that various combinations of FIGS. 5 and 6 are possible, i.e., the high frequency signal bias can be applied to some of the dynodes, and D.-C. bias to the remaining dynodes.

It will now be apparent that the technique described above makes it possible to design high sensitivity instruments either with high stability and a long time constant (using only three or four dynodes) or fast acting instruments with less stability (by using five or six dynodes). In addition, the use of more dynodes makes it possible to employ less expensive amplifiers. In a very inexpensive instrument, the phase sensitive detector can be replaced by a simple linear rectifier. The final choice of the system will be determined by specific application and by the desired value for money of the instrument.

It will be apparent that the embodiments shown are only exemplary and that various modifications can be made in construction and arrangement within the scope of my invention as defined in the appended claims.

I claim:
1. Radiant energy measuring means comprising
   (a) a photo-multiplier tube having a plurality of electrodes including,
   (b) a photosensitive cathode,
   (c) an electrode functioning as an anode, and

(d) a plurality of intermediate dynodes;
(e) input circuit means for applying between the cathode and at least one, but less than all of said dynodes successively higher levels of a high frequency voltage, said last dynodes being active and the remaining electrodes being inactive;
(f) means for square-wave modulating said voltage at a low frequency rate to produce groups of high frequency pulses at said low frequency rate when said cathode is stimulated by radiation;
(g) output circuit means coupled to the anode electrode;
(h) low frequency measuring circuit means responsive only to said low frequency and supplied by said output circuit means;
(i) means electrically connecting the inactive electrodes to one of the active dynodes to thus provide D.-C. bias between said electrode functioning as an anode and the inactive electrodes at a sufficiently low level so that these electrodes remain inactive during operation of the tube, the active dynodes constituting a first group of successive dynodes adjacent to the cathode and the inactive dynodes constituting a second group of successive dynodes; and
(j) output impedance means connected to said anode for developing an output signal at said low frequency across said impedance, said output impedance means being of extremely high ohmic value, in the order of megohms.

2. Photometer apparatus comprising a small, manipulatable sensing head, a window in said head, a photo-multiplier tube in said head, said tube having a light sensitive cathode aligned with said window for the reception of light and having also an anode structure and a series of intermediate multiplier dynodes; a casing, control means and indicating means for said photo-multiplier tube in said casing; and electrical connections between said head and said casing comprising shielded cable means; said control means comprising a high-frequency oscillator means, low-frequency modulating means for square-wave modulating the output of said high-frequency oscillator at a low-frequency rate; circuit means for applying said modulated high frequency between the cathode and at least one of said dynodes; a source of D.-C. biasing voltage in said casing, circuit means for applying a suitable D.-C. biasing voltage from said source between at least two dynodes of said series and said cathode; whereby one of said intermediate dynodes serves as the anode of the tube, means for applying suitable D.-C. bias voltage between all other dynodes and said cathode; circuit means for maintaining the dynodes between said intermediate dynode serving as an anode and the original anode structure, together with said original anode structure, at a lower potential than said intermediate dynode whereby they are rendered inactive in the circuit, said circuit means including an electrical connection between said inactive elements and a point of said D.-C. biasing voltage at said lower potential; resonant circuit means in the circuit of said cathode for rejecting substantially all energy at said low frequency from the photo-multiplier tube; output circuit means coupled to said intermediate dynode serving as anode; and low-frequency measuring means responsive only to said low frequency and connected to said output circuit means.

References Cited by the Examiner
UNITED STATES PATENTS

| | | | |
|---|---|---|---|
| 1,822,061 | 9/1931 | Roberts | 88—236 |
| 2,828,424 | 3/1958 | Moe | 250—207 |
| 2,846,500 | 8/1958 | Neeb | 250—207 |

OTHER REFERENCES

Summer, Photosensitors, London, Chapmon and Hall Ltd., Chap. 4, pages 75–77.

Seely, Electron Tube Circuits, McGraw-Hill; 2nd Ed. (1958); pages 270, 271, 472–474 and 613 (particularly FIGURES 8–32, 14–30, 14–31, and 19–15).

Rider et al., Basic Vacuum Tubes, John F. Rider; 1st Ed. (1955); pages 197–199 (particularly FIGURES 5–17 and 5–19 I, L, and M).

Geppert, Basic Electron Tubes, McGraw-Hill; 1st Ed. (1951); pages 277–278 and 284–285 (particularly FIGURES 9.3(b) and 9.13.

JEWELL H. PEDERSEN, *Primary Examiner.*